Patented June 20, 1939

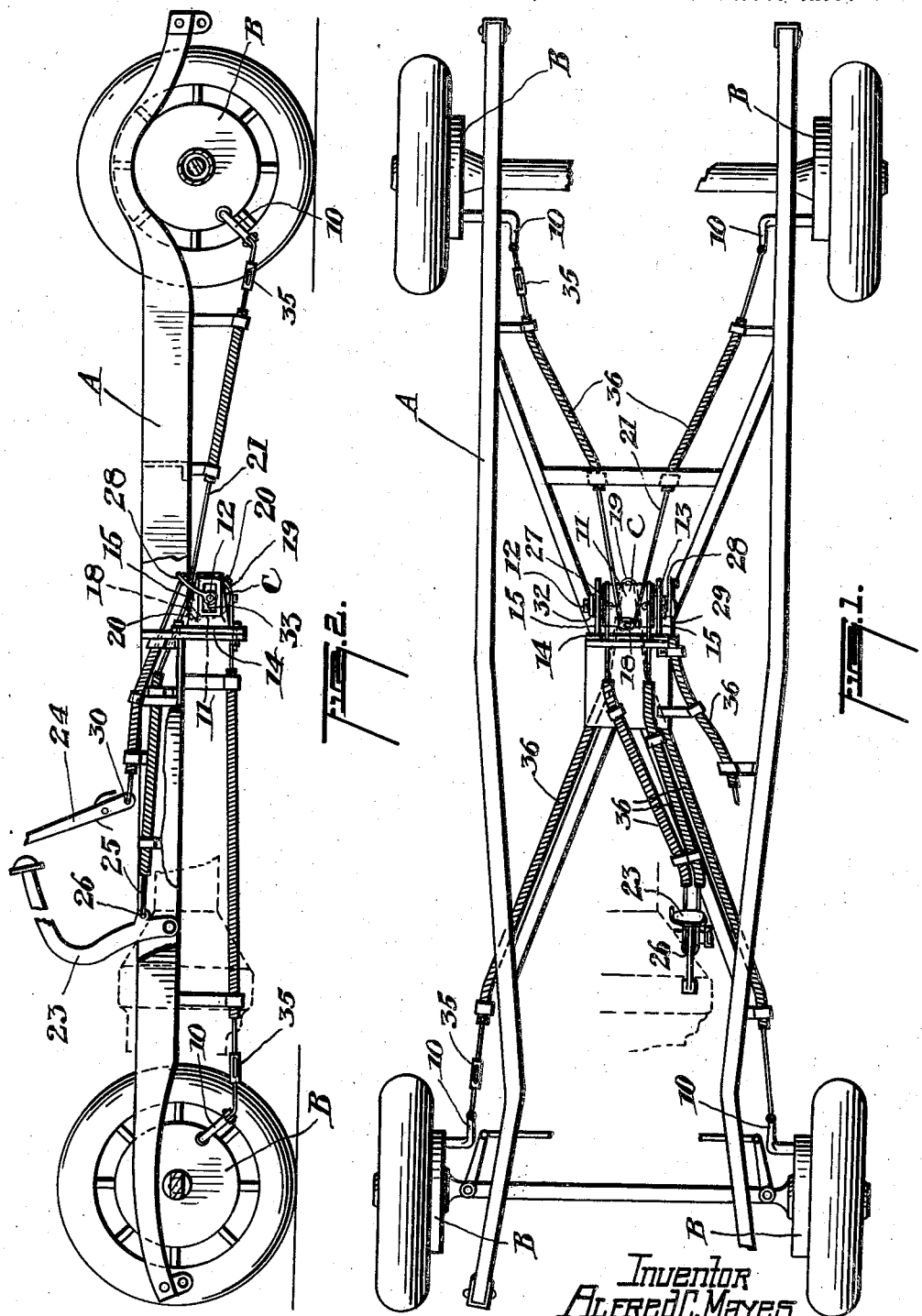

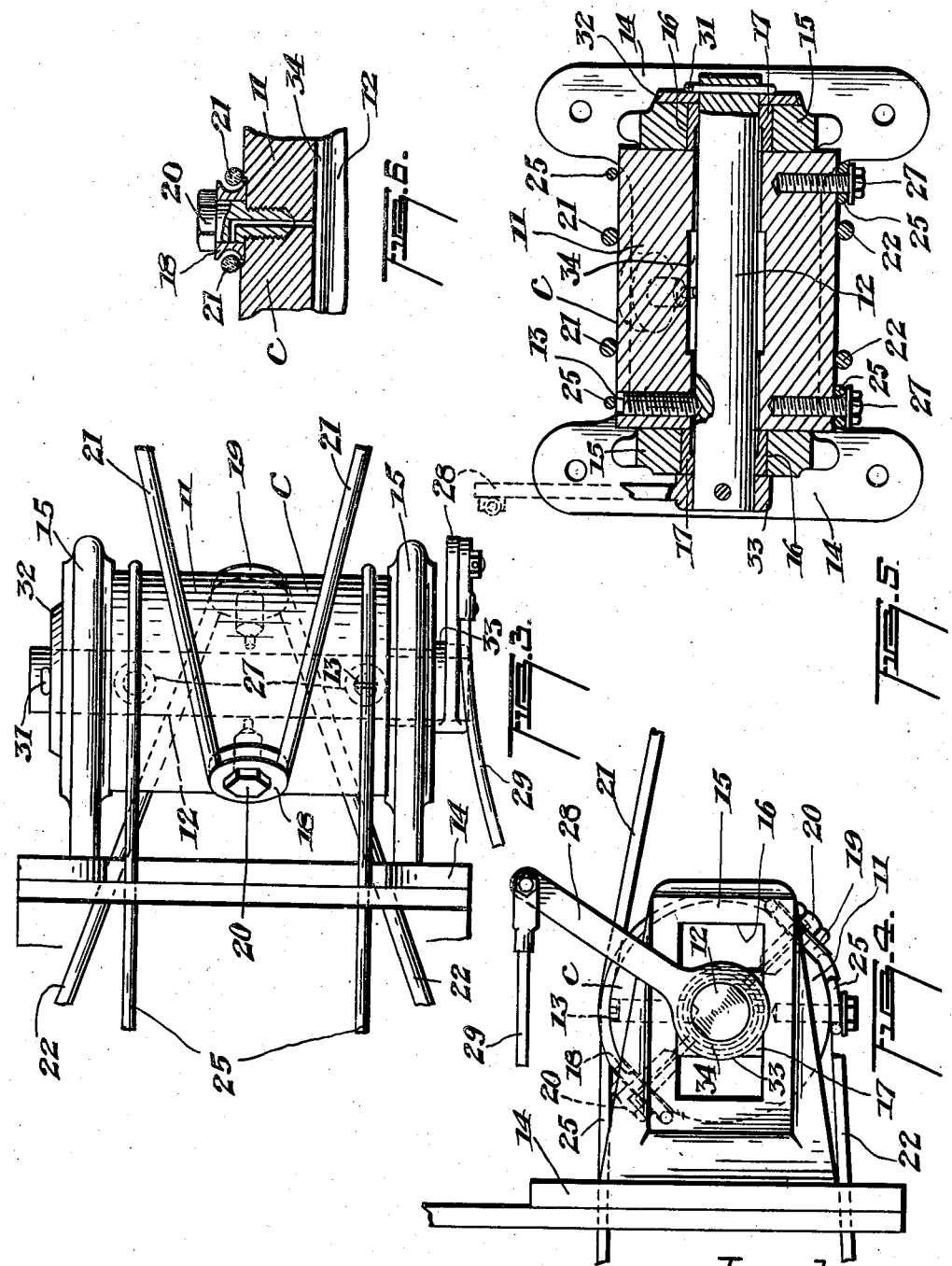

2,162,852

UNITED STATES PATENT OFFICE 2,162,852

FOUR WHEEL BRAKE EQUALIZING AND CONTROL MECHANISM FOR VEHICLES

Alfred Charles Mayes, Walkerville, Ontario, Canada

Application June 16, 1938, Serial No. 214,074
In Canada October 25, 1937

3 Claims. (Cl. 188—204)

This invention relates to four wheel brake equalizing and control mechanism for vehicles.

Up to the present time mechanical brake control mechanism for operating four wheel brakes has been open to the very serious disadvantage that the mechanism very easily gets out of adjustment so that the brakes are applied unevenly with consequent disadvantageous and sometimes dangerous results. A number of proposals have been made with a view to offsetting this serious disadvantage of mechanical braking structures but without a large measure of success. This is due to the fact that there are so many factors involved that even in the most expensive mechanical systems variations will take place after the vehicle has been run a little while. For instance, it is impossible to have all four wheels of the vehicle braking at the same time when linings may wear unevenly, brake rods may stretch, levers strain and brake shoe springs weaken. The use of cables has been generally found to be of advantage over brake rods and while good cables do not tend to stretch perhaps as much as brake rods, the same difficulties arise with cables. Moreover, attempts to overcome the difficulties have resulted in expensive brake control mechanism which has not solved the problem.

It is an object of the present invention to provide brake equalizing and control mechanism for four wheel mechanically controlled brakes which will imediately compensate for inequalities as between each brake of the vehicle so that they can be applied equally in all cases short of the complete wearing out of the brake lining of any one or more of the brakes.

A further object is to provide a mechanism of this kind which is simple in construction, inexpensive to manufacture and which may readily be mounted on a vehicle regardless as to whether the brakes are operated from the right or left hand side of the car.

A further object of the invention is to provide mechanism of this character which is readily operated by the usual brake pedal and/or by the emergency hand lever.

With these and other objects in view the invention generally comprises a floating rotatable member slidably mounted on the vehicle, connected to the brakes of the vehicle by cable means common to pairs of said brakes and slidably connecting with the rotatable member, the latter being connected with the brake operating mechanism of the vehicle and causing equal and simultaneous application of all four brakes at the same time when the brake operating mechanism is operated to cause rotation of the rotatable member.

The invention will be fully appreciated by reference to the following detailed specification taken in conjunction with the accompanying drawings.

In the drawings,

Figure 1 is a plan view of the chassis and wheel and brake assembly of a motor vehicle, showing the mechanical brake operating system according to the present invention mounted in operating relation.

Figure 2 is a side elevation of Figure 1 with the chassis partly broken away to better illustrate the connections involved.

Figure 3 is a plan view of the floating rotatable member which effects equal application of the four brakes of the vehicle when operated.

Figure 4 is a side elevation of Figure 3.

Figure 5 is a transverse section taken in the plane of the horizontal axis of Figure 3.

Figure 6 is a fragmentary sectional detail of the lubricating system.

Referring to the drawings A indicates any suitable vehicle chassis and B indicates the brake drums housing the usual brake shoes which are caused to be applied through the usual lever 10 or the like ordinarily connected with the brake operating mechanism of the vehicle by means of brake rods or cables. According to the present invention the brake equalizing and control mechanism C is mounted on the chassis in a suitable way and connected to the four brakes of the vehicle to operate them simultaneously and equally regardless of variations in the brake linings, brake springs or cables, etc.

This brake equalizing and control mechanism C is particularly illustrated in Figures 3, 4 and 5. This takes the form of a rotatable member preferably a drum 11 mounted upon an axle 12 and rigidly secured to the axle in any suitable way, such as by means of the screw 13. The axle is designed to project from each end of the drum and forms a means by which the drum is mounted. A preferred form of mounting structure consists in a bracket 14 having spaced apart parallel projecting arms 15, each arm being apertured as at 16 to provide guideways in which bearings 17 may slide. The projecting ends of the axle 12 are disposed in the bearings 17 and suitably retained therein so that the rotated drum 11 is thus slidably mounted in the bracket.

On the drum 11 pulleys 18 and 19 are mounted in opposed relation to one another, preferably by means of cap screws 20 or the like. These pulleys form the means which connects the drum with the brakes. As shown in Figure 3, the pulley 18 is adapted to receive the cable 21 which is designed to connect with the rear brakes, while pulley 19 receives the cable 22 designed to connect with the front brakes. It will thus be seen that these cables are common to pairs of brakes and that they are slidably connected with the drum by reason of the fact that when the drum is rotated anti-clockwise they will slide around the pulleys 18 or 19 to compensate for any inequalities between either brake of each pair. Thus the brakes of each pair may be equalized. However, this would not compensate for inequalities existing between either pair, as for instance if the front brakes were worn more than the rear brakes or vice versa, or if one shoe was worn more than others or inequalities existed in the springs or cables, etc. so as to cause a difference as between the movement of the cables 21 and 22. For instance, assume that the lining on the front brakes is worn more than that on the rear brakes.

When the brakes are applied through rotation of the drum 11, the rear brakes theoretically would be brought into engagement first as they are not worn so much. This would in effect mean that the cable 22 would have to travel farther than cable 21 in order that the front brakes could be applied. However, as the drum rotates and force is applied to cable 21, the drum simultaneously shifts rearwardly in the guideways formed by the apertures 16, so that the front brakes are applied simultaneously with the rear brakes regardless of the worn condition of the former. In the case where the front brakes are worn unequally, the cable 22 would shift around the pulley 19 as the drum is rotated, so that both front brakes would be applied equally and simultaneously with the application of the less worn rear brakes. Exactly the same action is the case where the rear brakes are worn more than the front brake or where only one brake is worn more than the others, while it is apparent that the drum 11 would in a similar manner compensate for inequalities in the cables or brake springs. Thus the brake equalizing and control mechanism functions to apply the brakes equally under all conditions.

As is clearly perceptible from a consideration of Figures 2 and 3 to 5, the drum 11 is readily connected with the usual brake operating means which include the brake pedal 23 and emergency hand brake 24. In the case of the former, connection may be made by means of cables 25 connected at one end with the brake pedal as at 26 and at the other being anchored to the drum 11 by means of bolts 27. In the case of the hand lever, one end of the axle may carry a lever arm 28 connected by a cable or the like 29 with the lever as at 30. The drum 11 and shaft 12 are retained on the bracket and in the bearings 17 in any suitable manner such as by a cotter pin 31 and washer 32 disposed at one end of the axle and the enlarged annular end 33 of the lever 28 at the opposite end of the axle. It will be noted that the washer 32 and the enlarged annular end of the lever 28 are of greater diameter than the width of the bearings so as to retain the latter in proper relation in the guideways formed by the apertures 16.

Lubrication of the drum 11 and associated parts may readily be accomplished by means of a main lubricating channel 34, see Figure 6, to which access may be obtained through the orifices in the drum receiving the screws 20, passageways being provided in the screws 20 as shown in Figure 6 permitting lubrication of the pulleys.

The bracket 14 is readily bolted to the chassis of the vehicle to mount the device in position, and it will be realized that it is a simple matter to mount or dismantle this construction. The lever 28 may be positioned on either side of the drum according to the side upon which the hand brake lever is positioned, and to dismantle the drum from its mounting, it is only necessary to release the screw 13 and withdraw the cotter pin 31.

In order to provide for the case where the cables might stretch excessively, where for instance a poor quality cable might be employed, a turnbuckle adjusting means 35 may be incorporated in the front and rear cable as illustrated in Figures 1 and 2. The cables, of course, may be, and preferably are housed within flexible tubular guides 36, as shown in Figures 1 and 2.

With the device mounted, it will be realized that it becomes one positive unit through which all four brakes are centered equally at the control drum. The device will operate accurately and efficiently at all times, thereby adding to safety in driving, and due to its simple construction the cost of manufacture is brought to a minimum. Apart from these advantages the device eliminates the use of brake rods and brake rod brackets and the tedious brake adjusting process, as the brakes must be adjusted and readjusted time after time in order that they may be kept in reasonable adjustment.

Various modifications may be made in this application without departing from the spirit thereof or the scope of the claims and therefore the exact forms shown are to be taken as illustrative only and not in a limiting sense, and it is desired that only such limitations shall be placed thereon as are disclosed in the prior art or are set forth in the accompanying claims:

What I claim as my invention is:

1. Four wheel brake equalizing and control mechanism for vehicles comprising a rotatable drum, means for slidably mounting said drum on the vehicle, means connecting said rotatable drum with the brake operating mechanism of the vehicle to cause rotation of said drum when said mechanism is operated, cable means common to pairs of said brakes and connected to the applicators therefor, and pulleys mounted on said drum for slidably receiving and actuating said cables when said drum is rotated.

2. Four wheel brake equalizing and control mechanism for vehicles comprising a rotatable drum, a shaft passing through said drum and rigidly connected therewith, said shaft projecting from the ends of said drum, a bracket member on the vehicle having projecting arms, said arms being formed with guideways, bearings slidably mounted in said guideways designed to receive the projecting ends of said shaft whereby said rotatable drum is slidably mounted on the vehicle, means connecting said drum with the brake operating mechanism of the vehicle to cause rotation of said drum when said mechanism is operated, cable means common to pairs of said brakes and connected with the applicators therefor, and pulleys mounted on the drum slidably receiving said cables and designed to actuate them when said drum is rotated.

3. In four wheel brake equalizing and control mechanism for vehicles, a rotatable drum, a shaft passing through said drum and rigidly connected therewith, said shaft projecting from each end of the drum, a bracket having projecting arms, said arms being formed with guideways, bearings slidably mounted in the guideways designed to receive projecting ends of the shaft, means for retaining said shaft and bearings on said bracket, and pulleys on said drum for slidably receiving cables designed to connect with the applicators of pairs of the brakes, said drum being designed to be connected with the brake operating mechanism of the vehicle.

ALFRED CHARLES MAYES.